March 10, 1942. C. R. FORDYCE ET AL 2,275,817
ANTIHALATION COATING
Filed Jan. 18, 1941

11 — EMULSION.
10 — SUPPORT.
12 — ANTIHALATION BACKING OF GUM ARABIC PHTHALATE.

13 — OVERCOATING OF GUM ARABIC PHTHALATE.
11 — EMULSION.
10 — SUPPORT.

11 — EMULSION.
10 — SUPPORT.
14 — LAYER OF GUM ARABIC PHTHALATE.
15 — DYE LAYER.

CHARLES R. FORDYCE
JOHN EMERSON
INVENTORS

BY
ATTORNEYS

Patented Mar. 10, 1942

2,275,817

UNITED STATES PATENT OFFICE 2,275,817

ANTIHALATION COATING

Charles R. Fordyce and John Emerson, Rochester, N. Y., assignors to Eastman Kodak Company, Rochester, N. Y., a corporation of New Jersey Application January 18, 1941, Serial No. 375,052

8 Claims. (Cl. 95—9)

This invention relates to photographic film and particularly to coatings to be applied thereto for various purposes, such as for preventing halation.

Use has previously been made of film-forming materials such as cellulose acetate phthalate for anti-halation film backings, for which purpose these materials are particularly useful by virtue of their selective solubility, being insoluble in water but convertible to water-soluble alkali salts in the photographic processing baths. The cellulose acetate phthalate does not dissolve in the developing bath because of a salting out effect but is rapidly removed when introduced in the wash water which follows.

One of the objects of the present invention is to provide a novel antihalation backing or protective coating for photographic film. A further object is to provide an antihalation backing or protective coating which is readily soluble in alkaline solutions, such as photographic developers.

Figure 1:
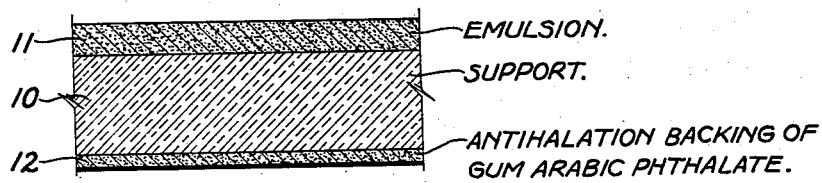
Figure 2:
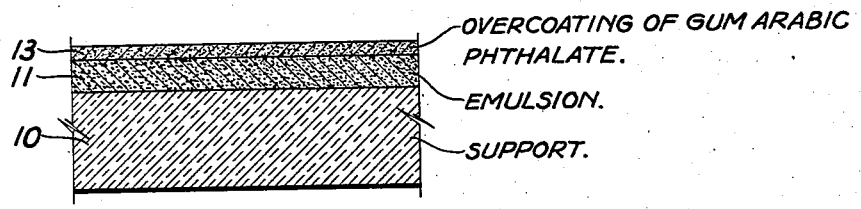
Figure 3:
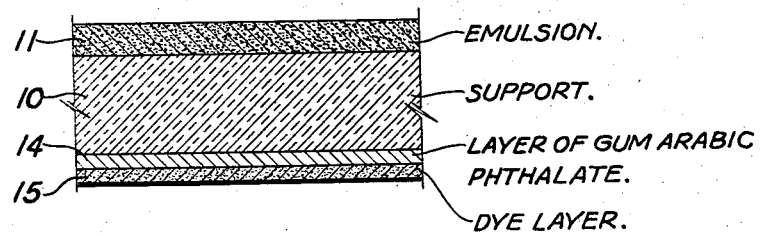

In the accompanying drawing Fig. 1 is an enlarged sectional view of a photographic film having an anti-halation backing made according to our invention, Fig. 2 is an enlarged sectional view of a photographic film having an overcoating layer made according to our invention, and Fig. 3 is an enlarged sectional view of a film having separate backing layers of alkali soluble material and dye.

We have found that dicarboxylic acid esters of gum arabic, such as gum arabic phthalate and gum arabic succinate are suitable for use as overcoating and backing layers for photographic film, and that they may contain an antihalation or filter dye, or may be coated on a film and overcoated with a dye solution. These materials are coated in solution as the free acid ester and upon treatment of the film in alkaline solution, such as photographic developing solutions, an alkali metal salt of the phthalate is formed and this compound dissolves freely in the solution. The gum arabic phthalate or succinate itself is not soluble in water but must be coated from a suitable solvent solution.

The gum arabic dicarboxylic acid esters are prepared by treating gum arabic with a dicarboxylic acid anhydride in the presence of a tertiary organic base such as pyridine in a manner similar to that described in Malm and Emerson U. S. 2,211,338, granted August 13, 1940. Gum arabic phthalate may be prepared as follows: To 500 parts of gum arabic are added 500 parts of distilled water with stirring. A mixture of 500 parts of pyridine and 500 parts of acetone is then added to precipitate the gum arabic. The gum is filtered off with suction and then washed with 500 parts of pyridine and again filtered off. The weight of the cake is approximately 780 grams. The resulting cake is treated with 216 parts of pyridine and 1500 parts of phthalic anhydride. The reaction mixture is heated on a steam bath for 6 hours at 90° C. At this point an additional 100 parts of phthalic anhydride is added and the heating continued for one hour more. The resulting light brown colored solution is diluted with 500 parts of distilled water and precipitated with stirring in distilled water acidified with 750 parts of 36% hydrochloric acid. The white powdery precipitate is filtered off and washed with distilled water. The product may be further purified by dissolving it in a 1:1 mixture of acetone and methyl alcohol and reprecipitating in distilled water. The product contains 62% phthalyl. It is soluble in the following solvents: methyl, ethyl, and propyl alcohols; $\beta$-methoxyethyl alcohol; $\beta$-ethoxyethyl alcohol; ethylene glycol monoacetate; ethylene formal.

This product may be applied in the known manner, which may be either application of a sub layer of the gum arabic phthalate to the photographic support followed by application of a suitable dye solution, or preparation of a sub composition containing both the gum arabic phthalate and the dye which is coated on the film support in one application. Suitable solvent mixtures for such applications depend upon the film support to which it is being applied (cellulose acetate, cellulose nitrate or mixed esters of cellulose are satisfactory). In general, mixtures composed largely of methyl or ethyl alcohol containing minor quantities of acetone or methyl cellosolve will be found most suitable.

Gum arabic succinate may be prepared in a similar manner. Fifty grams of gum arabic were dissolved in 100 g. of warm distilled water. After solution, the water was displaced by pyridine. The pressed cake consisting of 50 g. of gum arabic and 40 g. of pyridine was treated with 160 g. of pyridine and 100 g. of succinic anhydride. This mixture was stirred and heated at 85° C. for four hours. At the end of this period, the product was recovered by dilution of the dope with acetic acid and precipitation of the ester in acetone.

Our invention will now be described with reference to the accompanying drawing. As shown therein, Fig. 1 is a sectional view of a film support 10 of glass, cellulose nitrate, cellulose acetate, synthetic resin or other suitable material having thereon an emulsion layer 11. The opposite side of the support is provided with a layer 12 of gum arabic phthalate containing an antihalation dye.

Fig. 2 shows a film in which the support 10 is coated with an emulsion layer 11 and is overcoated with a layer 13 of gum arabic phthalate containing a filter dye. If the overcoating is used as protection against static or abrasion, the dye may be omitted from the layer. A protective coating of gum arabic phthalate with or without dye may also be applied to the reverse side of the film or plate.

Fig. 3 shows another modification of our invention in which the support 10 having an emulsion layer 11 on one side thereof is coated on the opposite side with a layer of gum arabic phthalate 14 not containing a dye and a layer 15 of dye coated from a solution of water or organic solvent is laid over the gum arabic phthalate layer 14.

Our invention will be more specifically described by means of the following examples which are illustrative only.

EXAMPLE I

Twenty grams of gum arabic phthalate was dissolved in 80 g. of a mixture of 70 parts of methyl alcohol and 30 parts of ethylene glycol monomethyl ether. The solution had a density of 0.91 and a viscosity of 10.2 centipoises. A thin coating of this solution was applied to the surface of a cellulose acetate propionate film base, and while still containing some solvent was tinted to the proper density with a solution of Spirit Nigrosine (Color Index No. 864) dye. A satisfactory antihalation backing was thus produced which was readily removable by alkaline developing solutions. In place of a dye, a coloring material such as carbon may be used in the backing layer.

To produce an antihalation backing by a single application, a dope is made of 10 g. of gum arabic phthalate, 40 g. of ethyl alcohol and 3 g. of Spirit Nigrosine (Color Index No. 846) dye. A thin coating of this solution is applied to the surface of a cellulose nitrate film base, and the solvent removed by curing. The resulting tinted layer was removable during processing in alkaline solutions.

EXAMPLE II

A solution was made of 10 g. of gum arabic succinate, 37 g. of ethyl alcohol and 1.25 g. of an organic solvent-soluble dye such as nigrosine. This solution was applied evenly to a roll of cellulose nitrate film base. The material was cured to produce a glossy anti-halation backing which was completely removable during film processing.

In every case the amount of coloring material is adjusted to give the desired density in the final coating. For antihalation effects the density should be approximately 0.2 expressed as a logarithm to the base 10, whereas a density greater or less than that may be required depending upon what use is made of the coating.

It is apparent from the above invention that our antihalation layers may consist of one, two or more separate coatings or layers and that the dyes may be contained in one or more of the layers. By the term "anti-halation layer" it is understood that we include any of these combinations whether one or more actual layers are contained in the coating.

Coatings of dicarboxylic acid esters of gum arabic have a number of favorable characteristics. In addition to forming a suitable carrier or supporting layer for an antihalation or filter dye, which is readily removed in photographic developers, they are resistant to moisture. An overcoating layer of a dicarboxylic acid ester of gum arabic, therefore, protects the film or the emulsion from the action of moisture and also may serve as a protective coating to avoid scratches and abrasion marks on films or plates. Numerous variations may be made in the coating solutions, solvents, dyes and other features of our invention and it is to be understood that the invention is to be taken only by the scope of the appended claims.

What we claim is:

1. A transparent photographic element comprising a support, a sensitive emulsion layer thereon, and a layer of a dicarboxylic acid ester of gum arabic thereon.

2. A transparent photographic element comprising a support, a sensitive emulsion layer on one side thereof, and an antihalation layer containing a dicarboxylic acid ester of gum arabic on the opposite side thereof.

3. A transparent photographic element comprising a support, a sensitive emulsion layer on one side thereof, and an antihalation layer of gum arabic phthalate on the opposite side thereof.

4. A sensitive photographic element comprising a cellulosic support, an emulsion layer on one side of said support and an antihalation layer of a dicarboxylic acid ester of gum arabic and a coloring material on the opposite side thereof.

5. A sensitive photographic element comprising a cellulose support, an emulsion layer on one side of said support, and an antihalation layer of a dicarboxylic acid ester of gum arabic and a dye on the opposite side thereof.

6. A sensitive photographic element comprising a cellulosic support, an emulsion layer on one side of said support, and an antihalation layer of a dicarboxylic acid ester of gum arabic and carbon on the opposite side thereof.

7. A sensitive photographic element comprising a support, a sensitive emulsion layer on said support and a protective coating of a dicarboxylic acid ester of gum arabic over the emulsion layer.

8. The method of providing a photographic element with an antihalation coating which comprises dissolving gum arabic phthalate in a nonaqueous solvent, coating the solution on the back face of the element, and coating a coloring material over the gum arabic phthalate layer.

CHARLES R. FORDYCE.
JOHN EMERSON.